United States Patent [19]

Binsack et al.

[11] 4,041,018

[45] Aug. 9, 1977

[54] THERMOPLASTIC CARBONATE-MODIFIED COPOLYESTERS AND A PROCESS FOR THEIR PREPARATION

[75] Inventors: Rudolf Binsack, Krefeld; Hugo Vernaleken, Krefeld-Bockum, both of Germany

[73] Assignee: Bayer Aktiengesellschaft, Germany

[21] Appl. No.: 597,167

[22] Filed: July 18, 1975

[30] Foreign Application Priority Data

July 24, 1974 Germany ............................ 2435507

[51] Int. Cl.² ...................... C08G 63/18; C08G 63/62
[52] U.S. Cl. ................. 260/75 R; 260/40 R; 260/45.7 P; 260/45.75 B; 260/45.95 R; 260/77.5 D
[58] Field of Search .................. 260/75 R, 77.5 D

[56] References Cited

U.S. PATENT DOCUMENTS

| | | | |
|---|---|---|---|
| 2,808,390 | 10/1957 | Caldwell | 260/75 R |
| 2,870,124 | 1/1959 | Ham | 260/75 R |
| 3,395,119 | 7/1968 | Blaschke | 260/47 XA |
| 3,444,141 | 5/1969 | Shima | 260/75 R |

*Primary Examiner*—Howard E. Schain
*Assistant Examiner*—W. C. Danison, Jr.
*Attorney, Agent, or Firm*—Connolly and Hutz

[57] ABSTRACT

Carbonate-modified copolyesters which are suitable for the production of mouldings by injection moulding or for the production of pipes, films and fibers by extrusion, can be obtained by reacting aromatic dicarboxylic acids or their ester-forming derivatives and carbonic acid esters of dihydric aliphatic alcohols which have carbonic acid ester groupings in the molecule and hydroxyalkyl end groups.

4 Claims, No Drawings

THERMOPLASTIC CARBONATE-MODIFIED COPOLYESTERS AND A PROCESS FOR THEIR PREPARATION

This invention relates to thermoplastic carbonate-modified copolyesters comprising recurring units derived from aromatic dicarboxylic acids or their ester-forming derivatives and carbonic acid esters of dihydric aliphatic alcohols having hydroxyalkyl end groups and 1 to 3 carbonic acid ester groupings in each ester molecule and to a process for their preparation. The preferred aromatic dicarboxylic acids are terephthalic acid and isophthalic acid, and the preferred carbonic acid esters are carbonic acid bis-hydroxyalkyl esters.

By way of example, the carbonic acid esters mentioned can be illustrated by the following formula (I):

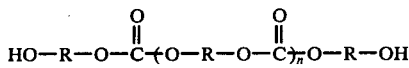
(I)

in which

R denotes divalent aliphatic radicals with 2 to 10 carbon atoms and n denotes an integer from 0 to 2, preferably 0.

Carbonic acid esters can also consist of mixtures of the compounds illustrated by the formula (I), mixtures with a predominant content of carbonic acid bis-hydroxyalkyl esters being preferred.

The carbonate-modified copolyesters can consist, for example, of structural units of the following general formula (II)

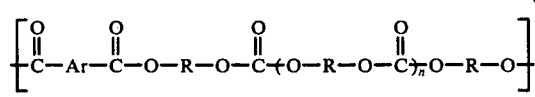
(II)

in which

*ar* denotes divalent aromatic radicals of the formula

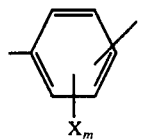

in which

X denotes alkyl radicals with 1 to 4 carbon atoms and/or halogen radicals, such as chlorine or bromine and m denotes an integer from 0 to 4, preferably 0, and R and n have the same meaning as in the formula (I).

It follows from the above definitions that in the formula (II) the grouping

preferably represents radicals of terephthalic acid and isophthalic acid.

According to a further embodiment of the invention, a minor proportion, preferably up to 10 mol %, of the radicals

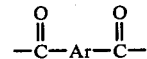

in the formula (II) can be replaced by radicals of aliphatic, dicarboxylic acids with 4 to 10 carbon atoms, such as those of succinic acid, adipic acid or sebacic acid. Accordingly, these modified copolyesters consist of structural units of the formulae (III)

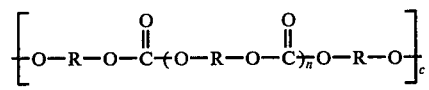
(III)

in which

A represents an aliphatic radical with 2 to 8 carbon atoms, a, b and c represent integers such that $a + b = c$ and b is less than a and preferably not greater than $(a + b)/10$, and Ar, R and n have the same meaning as in the formulae (I) and (II).

According to the starting materials, the end groups of the copolyester according to the invention can be carboxyl, carbalkoxy and hydroxyalkyl groups.

The molecular weights ($M_{LS}$) of the copolyesters according to the invention are in general between 15,000 and 200,000 preferably between 30,000 and 100,000.

The copolyesters according to the invention are obtained by esterifying or trans-esterifying aromatic dicarboxylic acids or their ester-forming derivatives, preferably terephthalic acid and/or isophthalic acid or their dimethyl esters, firstly with carbonic esters of dihydric aliphatic alchols having 1 to 3 carbonic acid ester groupings in each molecule, preferably carbonic acid bis-hydroxyalkyl esters, and secondly in the presence of esterification or trans-esterification catalysts which are in themselves known, at an elevated temperature, preferably at 150° to 250° C, and polycondensing the resulting reaction products under conditions which are in themselves known, the reaction being carried out in the presence of catalysts at about 200° to 300° C under reduced pressure.

The carbonic acid bis-hydroxyalkyl esters used as diol components according to the invention can be prepared in a simple manner by reaction of diols with carbonic acid esters, such as carbonic acid dialkyl esters or carbonic acid diphenyl esters, at least 2 mols of diol being employed per mol of carbonic acid ester. The reaction with carbonic acid dimethyl ester or carbonic acid diethyl ester is particularly simple since the methanol or ethanol split off can be distilled off easily so that the reaction can take place rapidly. The trans-esterification of the diols with carbonic acid dimethyl ester or carbonic acid diethyl ester as well as the polycondensation are accelerated by the presence of the usual catalysts.

Examples of catalysts suitable for the trans-esterification are alcoholates,, especially of alcohols containing 1 to 4 carbon atoms, glycolates, especially of glycols containing 2 to 6 carbon atoms, and acetates of metals of the groups Ia, IIa and IIb of the Periodic Table as listed in F. A. Cotton and G. Wilkinson, Advanced Inorganic Chemistry, 2nd edition, Interscience Publishers, Div. J. Wiley & Sons, New York 1966, especially the alcoholates, glycolates and acetates of lithium, sodium, potassium, magnesium, calcium, strontium, zinc and cadmium, e.g. sodium methanolate, calcium acetate.

Examples of catalysts suitable for the polycondensation are the oxides, formates, acetates, alcoholates, especially of alcohols containing 1 to 4 carbon atoms, glycolates, especially of glycols containing 2 to 6 carbon atoms, of the metals molybdenum, germanium, lead, zinc, antimony, titanium, gallium.

The oligocondensates mentioned can be prepared from the diesters by trans-esterification at elevated temperatures, optionally with application of a vacuum. According to a further process, the oligomeric carbonic acid esters can also be manufactured by lowering the ratio of the reactants from 1 mol of carbonic acid dialkyl ester : 2 mols of diol to b 1 : 1.5 mols.

A typical procedure for the preparation of the carbonic acid bis-hydroxyalkyl esters is given below:

Preparation of carbonic acid bis-(4-hydroxybutyl ester):

1,938 g (21.5 mols) of 1,4-butanediol and 1,181 g (10 mols) of carbonic acid diethyl ester are heated in the presence of 100 mg of calcium acetate, whilst the temperature slowly rises from about 100° C to 180° C, in such a way that the ethanol split off distills off continuously, a packed column which gives sufficiently good separation being used. After about 8 hours, 912 g (19.8 mols) of ethanol have been split off. The unconverted diethyl carbonate and 1,4-butanediol is then distilled off through the column during which time the temperature of the reaction product is not allowed to rise above 180° C. This gives 2,042 g (9,9 mols) of carbonic acid bis-(4-hydroxybutyl ester) as the residue, characterised by an OH number of 556 mg of KOH/g (theory: 544) and a content of carbonate bonds of 21.0% of $CO_2$ (theory: 21.3%).

Examples of suitable carbonic acid bis-hydroxyalkyl esters are: carbonic acid bis-(2-hydroxyethyl ester), carbonic acid bis-(3-hydroxypropyl ester), carbonic acid bis-(4-hydroxybutyl ester), carbonic acid bis-(2-methyl-3-hydroxypropyl ester), carbonic acid bis-(5-hydroxypentyl ester), carbonic acid bis-(2,2-dimethyl-3-hydroxypropyl ester), carbonic acid bis-(2-ethyl-3-hydroxypropyl ester), carbonic acid bis-(6-hydroxyhexyl ester), carbonic acid bis-(2-hydroxypropyl ester) and carbonic acid bis-(2-ethyl-2-methoxymethyl-3-hydroxy propyl ester).

The dicarboxylic acid component of the polyesters according to the invention consists of at least 90 mol percent of a dibasic aromatic dicarboxylic acid or of one of its ester-forming derivatives, preferably terephthalic acid and/or isophthalic acid or dimethyl terephthalate and/or dimethyl isophthalate. Furthermore, as already mentioned, minor amounts, preferably up to 10 mol percent, of the aromatic dicarboxylic acid or of the corresponding dialkyl ester can be replaced by aliphatic discarboxylic acids with 4 to 10 carbon atoms or their esters, such as succinic acid, adipic acid, sebacic acid or their esters.

The carbonate-modified copolyesters according to the invention have an intrinsic viscosity of 0.2 to 1.2 dl/g, measured in 1 : 1 phenol/tetrachloroethane, which can be further raised by a post -condensation at 5° to 50° below the melting point. They can be used for the production of mouldings by injection moulding or for the production of pipes, films and fibres by extrusion.

The copolyesters can be filled with fillers, such as, for example, glass powders micro-talc or graphite, or can be reinforced with reinforcing materials, such as, for example, glass fibres and asbestos fibres. Furthermore, these copolyesters can be provided with a flameproof finish for example with antimony trioxide, decabromodiphenyl ether and the like. Furthermore, these copolyesters can be stabilised with the known stabilisers based on the esters of phosphorous acid and phosphoric acid and on the phenols.

Linear, aromatic polyesters of aromatic dicarboxylic acids and of aliphatic or cycloaliphatic diols are known. Thus, for example, "Journal of Polymer Sci", A-1, Vol. 4, (1966), pages 1851 to 1859, describes polyesters of terephthalic acid and $\alpha,\omega$-diols with 2 to 10 carbon atoms. The melting points of these polyestersdecrease systematically with increasing number of the carbon atoms of the diols from about 260° C (2 carbon atoms) to 130° C (10 carbon atoms). However, polyesters with low melting points are no longer dimensionally stable at high temperatures and are therefore no longer usable for many applications.

The copolyesters according to the invention are as a rule highly crystalline and have high melting points. The melting points of the carbonate-modified copolyesters are, surprisingly, substantially higher, for the same number of carbon atoms of the co-condensed carbonic acid hydroxyalkyl esters than those of corresponding homopolyesters of pure C—C diols. A further advantage of the copolyesters according to the invention is their high toughness.

The examples which follow illustrate the invention:

EXAMPLE 1

97.1 g (0.5 mol) of dimethyl terephthalate and 105 g (0.7 mol) of carbonic acid bis-(2-hydroxyethyl ester) are heated in the presence of 0.05 g of titanium tetraisopropylate for 3 hours to 190° C and then for 2 hours to 210° C, during which 30 g of methanol distil off. The temperature is raised to 260° C over the course of 30 minutes whilst at the same time lowering the pressure to 1 mm Hg. The melt, the viscosity of which increases progressively, is left for 45 minutes at 260° C and 1 mm Hg. On cooling, the copolyester formed solidifies to a white crystalline mass.

For properties, compare the table.

EXAMPLE 2

19.4 g (0.1 mol) of dimethyl terephthalate and 18.3 g (0.105 mol) of carbonic acid bis-(3-hydroxypropyl ester) are heated in the presence of 0.04 g of titanium tetrabutylate for 30 minutes at 180° C, 30 minutes at 200° C and 30 minutes at 220° C and then for 60 minutes to 245° C, whilst slowly lowering the pressure to 0.3 mm Hg. After 40 minutes,, the polycondensation is terminated.

The properties of the crystalline copolyester obtained can be seen from the table.

EXAMPLE 3

3.5 kg (18 mols) of dimethyl terephthalate and 3.72 kg (18 mols) of carbonic acid bis-(4-hydroxybutyl ester) are continuously heated, in the presence of 3.2 g of titanium tetrabutylate, to 230° C over the course of 3 hours. The pressure is then lowered to 1 mm Hg over the course of 60 minutes whilst at the same time raising the temperature to 245° C. After 4 hours, the polycondensation is terminated.

The properties of the crystalline copolyester can be seen from the table.

EXAMPLE 4

19.4 g (0.1 mol) of dimethyl terephthalate and 24.2 g (0.103 mol) of carbonic acid bis-(5-hydroxypentyl ester) are heated, in the presence of 2 mg of calcium acetate and 2 mg of zinc acetate, to 180° C for 30 minutes and then to 200° C for 15 minutes each. The temperature is raised to 245° C over the course of 45 minutes whilst at the same time lowering the pressure to 0.3 mm Hg. After 2 hours, the polycondensation is terminated.

The properties of the crystalline copolyester can be seen from the table.

EXAMPLE 5

16.9 g (0.0871 mol) of dimethyl terephthalate and 22.9 g (0.0873 mol) of carbonic acid bis-(6-hydroxyhexyl ester) are heated in the presence of 2 mg of calcium acetate, 2 mg of zinc acetate and 1 mg of antimony trioxide, for 30 minutes at 180° C, 30 minutes at 200° C and 30 minutes at 240° C. The pressure is lowered to 0.3 mm Hg over the course of 1 hour. After a further hour, the polycondensation is terminated. The viscous melt slowly solidifies to a white crystalline mass, the properties of which can be seen from the table.

EXAMPLE 6

15.6 g (0.804 mol) of dimethyl terephthalate and 20.0 g (0.0897 mol) of carbonic acid bis-(2,2-dimethyl-3-hydroxypropyl ester) are heated, in the presence of 0.02 g of titanium tetrabutylate, for 30 minutes to 180° C, 30 minutes to 200° C, 30 minutes to 220° C and 30 minutes to 250° C. The pressure is then lowered to 0.4 mm Hg over the course of 45 minutes whilst at the same time the temperature is raised to 270° C. After 20 minutes the polycondensation is terminated. On cooling, the viscous melt of the copolyester solidifies to a hard transparent mass, the properties of which can be seen from the table.

EXAMPLE 7

97.1 g (0.5 mol) of dimethyl terephthalate together with 39.4 g (0.263 mol) of carbonic acid bis-(2-hydroxyethyl ester) and 54.1 g (0.263 mol) of carbonic acid bis-(2-hydroxybutyl ester) are heated, in the presence of 0.05 g of titanium tetraisopropylate, for 3 hours to 190° C and 2 hours to 210° C. The temperature is raised to 260° C over the course of 30 minutes whilst lowering the pressure to 1 mm Hg. After a further 45 minutes, the polycondensation is terminatd. On cooling, the viscous melt solidifies to a white crystalline mass, the properties of which can be seen from the table.

Table

| Example | Carbonic acid bis-hydroxyalkyl ester Hydroxyalkyl radical | C-number | relative viscosity[1] | Melting point[2] °C |
|---|---|---|---|---|
| 1 | 2-Hydroxyethyl | 5 | 1.25 | 237 |
| 2 | 3-Hydroxypropyl | 7 | 1.45 | 205 |
| 3 | 4-Hydroxybutyl | 9 | 1.60 | 180 |
| 4 | 5-Hydroxypentyl | 11 | 1.35 | 70 |
| 5 | 6-Hydroxyhexyl | 13 | 1.37 | 92 |
| 6 | 2,2-Dimethyl-3-hydroxypropyl | 5 | 1.38 | — |
| 7 | 50 mol % of 2-hydroxyethyl 50 mol % of 4-hydroxybutyl | 7[3] | 1.79 | 205 |

[1]measured at a concentration of 5 g / liter in 1 : 1 phenol/tetrachloroethane, at 25° C
[2]measured by DTA in the PERKIN-ELMER DSC-2 apparatus
[3]statistical

We claim:

1. A copolyester prepared by esterifying or transesterifying in the presence of an esterification or transesterification catalyst and at elevated temperature a mixture consisting essentially of substantially equal molar amounts of
   a. an aromatic dicarboxylic acid or ester thereof and
   b. a carbonic acid ester of the formula

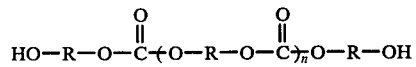

wherein R is a divalent aliphatic radical with 2 to 10 carbon atoms and $n$ is an integer from 0 to 2 and subsequently polycondensing resulting product in the presence of a polycondensation catalyst at a temperature of about 200° to 300° C. and under reduced pressure.

2. The copolyester of claim 1 wherein (a) includes a minor amount of an aliphatic dicarboxylic acid and having 4 to 10 carbon atoms.

3. The copolyester of claim 1 wherein (a) is of the formula

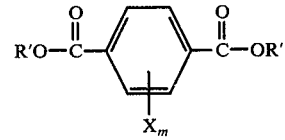

wherein each R' is hydrogen or methyl, X is alkyl having 1 to 4 carbon atoms, chlorine or bromine and $m$ is an integer from 0 to 4.

4. The copolyester of claim 3 wherein each R' is hydrogen and $m$ is 0.

* * * * *